(12) United States Patent
Ballhausen et al.

(10) Patent No.: US 7,354,366 B2
(45) Date of Patent: Apr. 8, 2008

(54) TOOTHED BELT

(75) Inventors: Ulrich Ballhausen, Bad Driburg (DE); Gerry King, Londonderry (GB)

(73) Assignee: Arntz Beteiligungs GmbH & Co. KG (DE)

( * ) Notice: Subject to any disclaimer, the term of this patent is extended or adjusted under 35 U.S.C. 154(b) by 698 days.

(21) Appl. No.: 10/489,446

(22) PCT Filed: Sep. 10, 2002
(Under 37 CFR 1.47)

(86) PCT No.: PCT/DE02/03369
§ 371 (c)(1),
(2), (4) Date: Mar. 10, 2004

(87) PCT Pub. No.: WO03/023254
PCT Pub. Date: Mar. 20, 2003

(65) Prior Publication Data
US 2006/0264289 A1    Nov. 23, 2006

(30) Foreign Application Priority Data
Sep. 10, 2001   (DE) ............................... 101 44 547

(51) Int. Cl.
F16H 5/20    (2006.01)
F16H 1/04    (2006.01)
F16H 5/06    (2006.01)

(52) U.S. Cl. ........................................ 474/260

(58) Field of Classification Search ............... 474/205, 474/237, 260–265, 268, 271; 428/295.1, 428/297, 300.4, 375, 390; 57/200, 211, 215, 57/244; 156/137–139, 279
See application file for complete search history.

(56) References Cited

U.S. PATENT DOCUMENTS

| | | | | |
|---|---|---|---|---|
| 4,838,843 A | * | 6/1989 | Westhoff | 474/205 |
| 5,112,282 A | * | 5/1992 | Patterson | 474/260 |
| 5,891,561 A | * | 4/1999 | Kinoshita et al. | 428/375 |
| 6,485,386 B2 | * | 11/2002 | Yuan et al. | 474/268 |
| 6,561,937 B1 | * | 5/2003 | Wegele | 474/263 |
| 6,601,378 B1 | * | 8/2003 | Fritsch et al. | 57/238 |

FOREIGN PATENT DOCUMENTS

| | | | | |
|---|---|---|---|---|
| EP | (0662571 A1 | * | 7/1995 | |
| EP | (1229259 A1 | * | 8/2002 | |
| JP | (09-290467 A | * | 11/1997 | |
| JP | (11-288190 A | * | 10/1999 | |
| JP | (11-336847 A | * | 12/1999 | |
| JP | (2000-104795 A | * | 4/2000 | |
| JP | (2000-337445 A | * | 12/2000 | |
| WO | WO 03/023254 | | 3/2003 | |

* cited by examiner

*Primary Examiner*—Marcus Charles
(74) *Attorney, Agent, or Firm*—Robert W. Becker; Robert W. Becker & Assoc.

(57) ABSTRACT

A toothed belt for the transmission of force is provided, a polyurethane body forms an outer layer and may be fabric-reinforced. Teeth of polyurethane are formed on the polyurethane body as an inner layer. High-strength tension elements are disposed between the outer layer and the teeth and are formed of spirally wound, spaced-apart cord filaments. A material layer of wear-resistant material covers the inner peripheral surface of the belt and hence the teeth. The cord filaments can be comprised of polyester-polyacrylate fibers/filaments produced by fusion spinning from liquid crystal polymers, and PBO fibers/filaments. Alternatively, the cord filaments can be comprised of hybrid filaments of high-strength aramid fibers and elastic polyamide fibers, or the hybrid filaments can have a high-strength filament component and a dampening or elastic filament component.

6 Claims, 1 Drawing Sheet

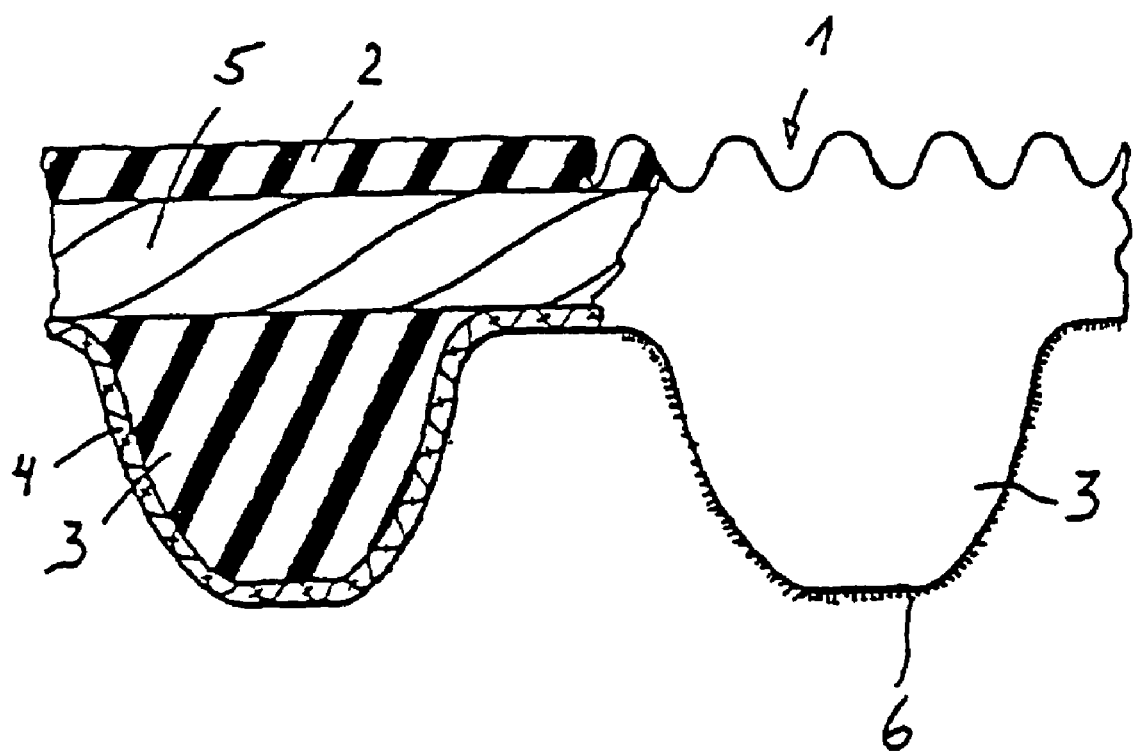

TOOTHED BELT

BACKGROUND OF THE INVENTION

CROSS-REFERENCE TO RELATED APPLICATIONS

The instant application should be granted the priority dates of Sep. 10, 2001, the filing date of the corresponding German patent application 101 44 547 4, as well as Sep. 10, 2002 the filing date of the International patent application PCT/DE02/03369.

The invention relates to a toothed belt for the transmission of force.

The state of the art includes toothed belts described, for example, in EP 0 092 361 B1, where the toothed belt body is comprised of polyurethane having embedded therein high-strength tension elements, whereby the inner peripheral surface of the belt, and hence the teeth, are covered by a wear-resistant fabric reinforcement. In order to achieve a high ability to transmit load, the tension elements comprise a synthetic cord material of spirally wound aramid fibers that are applied in a spaced-apart, side-by-side relationship between an outer layer of the toothed belt body and the teeth that form an inner layer of the toothed belt body. To ensure an adequate load-transmitting connection between the outer layer and the inner layer, which includes the teeth, the cord occupies approximately 64% to approximately 81% of the width of the belt.

To compensate for fatigue of the utilized aramid tension elements that is caused by operation, the starting resistance to tension of these tension elements is oversized in order in this manner to achieve a time frame that is adequate for most applications for the use of these toothed belts. Pursuant to EP 0 841 500 A2 it is furthermore known to use for these tension elements a cord of carbon fibers, whereby here also a significant oversizing of the tensile strength of the tension elements achieves a creep strength as a function of time that is satisfactory for most cases.

The high tension load that occurs in toothed belts leads, among other things, to a strong transverse stress within the tension elements. This stress is further reinforced by the structure of the twisted cords. Due to the twisted form of the cords, every force in the longitudinal direction is also converted into a force component in the transverse direction, in other words contraction. In particular, aramid fibers/filaments have a very sensitive reaction to such forces. This transverse contraction leads to damage of the fibers, which in turn leads to a rapid and premature loss of tensile strength.

SUMMARY OF THE INVENTION

The invention is based upon the recognition that the fatigue or creep strength of toothed belts can be significantly improved by the use of fibers/filaments in the cord that are especially suited therefor. For a toothed belt having a belt body of polyurethane (PU), which is customarily used for such belts, three ways were found that pursuant to the invention can also be used in combination with one another.

1. Pursuant to a first approach, the cord filaments are comprised of polyester-polyacrylate fibers or filaments produced by fusion spinning from liquid crystal polymers, and/or polyparaphenylene-2,6-benzobisoxazole fibers/filaments that are designated as PBO fibers/filaments, whereby the proportion of polyester-polyacrylate components is preferably between about 4-96%, the rest being PBO components.

2. Pursuant to a second approach, the PBO fibers/filaments are dispensed with, i.e. the cord filaments comprise only polyester-polyacrylate fibers that are produced by fusion spinning from liquid crystal polymers.

The foregoing approaches are based upon the idea that as load carriers no or at least not only aramid fibers are used. Up to now, essentially only fibers of aramids or carbon were viewed as suitable, since the strength of such fibers is sufficiently high. Other polymeric fibers, such as polyester, are not suitable for use in heavy duty toothed belts of polyurethane (PU) due to their low modulus (high elongation) and their low strength. The invention follows the path of using a cord of a polyester-polyacrylate fiber that is obtained via a high-temperature fusion spinning process, also in combination with PBO fibers/filaments. In this connection, from a spinning approach formed from a "liquid crystal", by extrusion of the liquid through very fine spinning nozzles, a nearly perfect orientation of the molecules within the fibers is achieved. This leads to an excellent strength and freedom from fatigue.

The polyester-polyacrylate used for the manufacture of these fibers/filaments essentially has the following molecular structure:

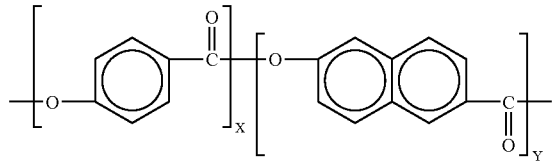

In the following table, some typical data of such polyester-polyacrylate fibers/filaments are indicated by way of example for Vectran® HS, produced by Celanese Acetate LLC, Charlotte, N.C. (USA).

It was discovered that in particular the resistance to wear, which can be used as an indication for the fatigue, was realized up to about 10 times greater than with aramids (para-meta-aramids).

Illustrated in the following are a number of technical properties of fibers/filaments of polyester-polyacrylate, corresponding to Vectran HS and PBO, in comparison to merely aramid fibers:

| Fibers | Polyester-Polyacrylate-Fibers Vectran HS | Various aramid fibers for comparison | | | PBO |
|---|---|---|---|---|---|
| | | Kevlar 29 | Technora T200 | Twaron 1055 | Zylon from Toyobo |
| Denier | 1500 | 1609 | 1512 | 1485 | 500 |
| Specific Strength (g/D) | 23.0 | 19.4 | 24.9 | 21.2 | 40 |
| Elongation (%) | 2-3.3 | 3.6 | 4.2 | 2.6 | 2-3 |
| Start Modulus (g/D) | 525 | 458 | 574 | 712 | 1200-2100 |
| Resistance to Wear (Cycles) | 14795 | 1249 | 1681 | 588 | ~3750 |

Low Temperature Sensitivity

The strength as opposed to belts having aramid as load-carriers at a temperature level of 275° C. over a 24 hour period drops to only 85% of the original, compared to 70% with aramid.

Practically no reduction of the strength could be determined at frequent heating up and cooling off. This is a typical stress in an exacting environment. In such cases, aramid exhibits great fatigue, which leads to a reduction of the starting strength to about 60%.

Low Chemical Sensitivity

Particularly in PU toothed belts, the cord is subjected to the aggressive media in the environment. It is in particular not protected on the sides. Thus, for example, the use of belts in swimming pools always leads to problems, since the chlorine used there attacks the load carriers. Here the inventive use of the aforementioned fibers has shown to be particularly advantageous, since here there is no sensitivity to many aggressive chemicals.

Good Characteristics during prolonged high stress (creeping)

Toothed belts with, for example, Vectran HS as load carriers, exhibit no creeping even under high, prolonged stress. Therefore, they need not be retightened, and the belt tensioners that are used can have closer tolerances. Thus, an extremely high positioning precision can be achieved even with toothed belts under high continuous load.

Good Alternating Bending Strength Significantly Increases the Service Life.

The alternating bending strength of polyester-polyacrylate fibers is significantly better in comparison to aramid fibers. Since drive and positioning belts are subjected to a permanent bending stress, this characteristic is of particular significance for the service life of a toothed belt of PU or rubber with, for example, Vectran HS as load carriers. A comparable belt with Vectran HS as load carriers still has 70% of the starting strength after 3000 cycles.

Dampening Characteristics

A belt provided with these heavy duty fibers in the load carriers exhibits a particularly good dampening property in comparison to belts having aramids. This is directly an advantage for the quiet running, especially of toothed belts, since due to the polygon effect caused by the teeth, the belts are subjected to a continuous stimulus in different frequencies. Since the requirements of quiet running are gaining significance, especially also due to rising environmental awareness, and hence increasing interest in quiet drives, this is a not to be underestimated advantage of belts having such fibers as load carriers.

By including PBO fibers/filaments in the cord tension elements, the characteristics of the belt can be significantly improved.

3. A third approach is that in addition to aramid fibers as a main constituent t a small amount of an additional dampening fiber component in the form of polyamide fibers/filaments is used in the cord construction, so that the transverse contraction resulting from tension has a uniform effect upon the overall fiber composite without force peaks. Due to this dampened and uniform introduction of force, lower force peaks result in the cord, i.e. the sensitive aramid load carriers are subjected to lower transverse stresses, and it is thus subjected to less fatigue. As a result, an aramid having a lower specific strength can be used, since during its use it loses less strength, and thus reaches the critical strength only later.

Particular advantages of the belts produced with these hybrid fibers are:

Good Adhesion

By incorporating the aramid fibers into an elastic polyamide matrix, the adhesion to the surrounding PU is significantly improved. This leads to an improved cohesion of the belt composites, and hence also to a significantly increased service life of the toothed belt produced in this manner.

Lower Fatigue

Toothed belts with only high-strength aramid as load carriers or tension elements have the unfavorable characteristic of relatively rapidly registering a considerable decline in strength. To counteract this, up to now the starting strength of the fibers utilized was set so high that within the expected service life (e.g. limited by friction), the strength did not drop below the permissible amount. The use of hybrid filaments of aramid and polyamide fibers, such as Twaron TA (produced by Tejn Twaron), permits, however, the use of aramid fibers with a considerably lower starting modulus and starting strength, since the drop of these characteristics is considerably slowed and reduced in scope by the improved inner support (and hence careful treatment ) of the aramid fibers that carry the load.

With the use of the hybrid filament, the strength and the starting modulus are, over a wide range of the useful life, greater than with heavy duty aramids alone.

Inner Dampening

Due to the combination of elastic polyamide and high-strength aramid fibers, there results a novel composite structure that is characterized by a high dampening.

Due to this dampening, the inner friction, and hence heating, are reduced, so that the thermal effect upon the surrounding polymer is reduced, and hence the service life of the hybrid element on the whole is increased, and on the other hand the thermal stressing of the aramid is reduced. This in turn leads to the improved aging effect of the hybrid filament and as a result to the longer service life of the toothed belt produced therewith.

Improved Processing

By the use of hybrid filaments, the processing of the various components to form a heavy duty toothed belt is significantly improved. The sensitivity to mechanical damage due to, for example, kinking, impact, etc. is significantly improved. The adhesion in the processing state is also significantly improved. In addition, the improved cutting quality is exhibited in an improved edge appearance of the belt, which with hybrid filaments has fewer slubs or fluff at the sides as a consequence of the cutting of a roll.

Improved Resistance to Transverse Contraction

Due to its multiple stressing, toothed belts subject the load carriers to a considerable transverse stressing. This also varies greatly in height and direction. A heavy duty aramid is particularly subjected to such stresses. The individual fibers are extremely sensitive in the transverse direction. This is then exhibited in a rapid decline in strength of the overall belt. Due to the incorporation of the aramid fibers into the elastic polyamide matrix in the hybrid filament, there results a particularly good protection against transverse stressing of the individual aramid filaments in the cord. In practical usage, the fatigue or creep strength is thereby considerably improved.

The use of polyurethane for drive belts is part of the overall state of the art, as described, for example, in EP 0092361 B1 (essentially corresponding to U.S. Pat. No. 4,838,843), U.S. Pat. No. 5,870,194 and further patents.

The polyurethane that forms the belt body is produced from pre-polymers via polymerization or cross-linking agents and/or chain elongation agents. With the production of drive belts of all types, generally 4,4'-methylenebis (2-chloroaniline) having the chemical formula $C_{13}H_{12}Cl_2N_2$ is used as cross-linking agent. This cross-linking agent, which is found in the marketplace under the abbreviation MbOCA, is AMES-positive.

It is therefore a further object of the invention to provide a drive belt with which, without adversely affecting the belt strength, and in particular the resistance to wear during the preparation of the polyurethane belt body, it is possible to dispense with the substance MbOCA.

To realize this object the inventive drive belt is characterized in that the belt body comprises a polyurethane that has been polymerized using 4, 4' methylenebis 3-chloro-2, 6-diethylaniline) having the chemical formula $C_{21}H_{28}Cl_2N_2$—abbreviated M-CDEA.

This cross-linking agent is a substance that is AMES-negative and in addition also leads in a surprising manner to an improvement in the belt strength.

With belts, comparable to the belt profile T10/1000/Width 16 mm having a cord insert of steel fibers/filaments, there result the values that can be seen from the following table, which in an analogous manner can be applicable to differently constructed cord inserts:

| Polyurethane with | Twisting Moment (Nm) | | | |
|---|---|---|---|---|
| | 3 | 5 | 7 | 9 |
| MbOCA | 300 hrs. | 300 hrs. | 42 hours. | 22 hours. |
| M-CDEA | 300 hrs. | 300 hrs. | 300 hrs. | 300 hrs. |

In addition, with the use of M-CDEA the otherwise frequently occurring shearing of the teeth is reduced, as a result of which up to now the synchronism during the belt operation was reduced.

BRIEF DESCRIPTION OF THE DRAWINGS

The invention will be described in greater detail in the following with the aid of the drawing, which as a sectional view shows a portion of a toothed belt pursuant to EP 0 841 500 A2, the basic construction of which coincides with the inventive toothed belt.

DESCRIPTION OF SPECIFIC EMBODIMENTS

As with the known toothed belt pursuant to EP 0 841 500 A2, the toothed belt 1 has an outer layer 2 of possibly fabric-reinforced polyurethane (PU). Formed on this outer layer is an inner layer that forms teeth 3 and that is also made of polyurethane. Embedded in the polyurethane bodies comprised of the outer and inner layers are high-strength tension elements (load-carriers) of spirally wound cord filaments 5, that are laterally spaced-apart and occupy approximately 64-81% of the width of the belt. The teeth 3 are covered by a material layer 4 of wear-resistant material.

The cord filaments 5 preferably comprise polyester-polyacrylate fibers/filaments and PBO fibers/filaments.

Pursuant to further invention, the cord filaments 5 comprise polyester-polyacrylate fibers that are produced by fusion spinning of liquid crystal polymers. These polyester polyacrylate fibers preferably have the values given in the previous table for Vectran HS.

Pursuant to the present invention, the cord filaments 5 can be embodied as hybrid filaments having a high-strength filament component, such as filaments/fibers of polyester-polyacrylate, PBO and aramid, preferably in proportions of approximately 70-95%, and a dampening or elastic filament component, such as filaments/fibers of polyamide and/or polyethylenenaphthalate, preferably in proportions of approximately 30-5%. Hybrid filaments, comprising the above described Twaron TA and polyamide, are already used for drive belts having a matrix or a belt body of rubber, not however for toothed belts having a polyurethane body.

The material layer 4 that covers the teeth, while having an adequate flexibility, should have a high resistance to tension, pressure and impact, as well as a low friction coefficient and a good adhesion with the polyurethane body.

For this purpose, the material layer 4 comprises an elastic fabric, preferably of polyamide filaments or fibers as well as filaments having a low friction coefficient, preferably polytetrafluoroethylene (PTFE) filaments or fibers (teflon fibers). Independent of the construction or composition of the material layer, it can preferably also be provided on the outside with a PTFE coating.

Pursuant to the present invention, the material layer 4 can also comprise a composite construction of combinations of fleece, films and fabric, as long as one ensures that this composite construction has adequate flexibility, tension and impact values as well as friction coefficients, and a good adhesion with polyurethane. Pursuant to a further embodiment of the invention, the material layer 4 that covers the teeth can also be provided with a flocking such that the material layer fabric is provided with a thin layer of short fiber flocking 6 in a predominantly perpendicular orientation relative to the surface of the material layer, as is schematically illustrated. This flocking can, for example, occur in a continuous or discontinuous process. The base fabric, for example prior to the processing, is provided with fibers on the contact side, is built up, and is subsequently vulcanized, or after the polymerization, the belt or roll is provided with textile flocking. The goal is to achieve, via the short fibers, a further protection of the fabric used for the material layer 4, to improve the quiet running of the belt, and to increase the service life.

The invention also relates to the use of the aforementioned materials, namely in particular the mentioned cord tension elements, polyurethane, polymerized using M-CDEA, for the production of drive belts and in particular toothed belts.

The present invention is, of course, in no way restricted to the specific disclosure of the specification and drawings, but also encompasses any modifications within the scope of the appended claims.

The invention claimed is:

1. A toothed belt for the transmission of force, comprising:
    a polyurethane body that forms an outer layer and is optionally fabric-reinforced;
    teeth of polyurethane that are formed on said polyurethane body as an inner layer;
    high-strength tension elements disposed between said outer layer and said teeth, wherein said tension elements are formed of spirally wound cord filaments that are laterally spaced from one another, wherein said cord filaments are comprised of polyester-polyacrylate fibers or filaments produced by fusion spinning from liquid crystal polymers; and a material layer of wear-resistant material that covers an inner peripheral surface of said belt and hence said teeth thereof.

2. A toothed belt according to claim 1, where in said polyester-polyacrylate fibers or filaments have characteristics having essentially the following values:

| | |
|---|---|
| Spec. Strength (g/D) | 23.0 |
| Elongation (%) | 2-3.3 |
| Start Modulus (g/D) | 525 |
| Resistance to Wear | greater than 5000 cycles. |

3. A toothed belt according to claim 1, wherein said material layer has an adequate flexibility, a high resistance to tension and impact, a low coefficient of friction, and a good adhesion to polyurethane.

4. A toothed belt according to claim 1, wherein said cord filaments are furthermore comprised of hybrid filaments of high-strength aramid fibers and elastic polyamide fibers.

5. A toothed bed according to claim 1, wherein the belt body that forms the outer layer and the teeth comprises a polyurethane polymerized using methylene (3-chloro-2,6-diethylaniline.

6. A toothed belt according to claim 1, wherein the polyester-polyacrylate fibers or filaments in the cord filaments are present in a proportion of 4-96%.

* * * * *